(12) United States Patent
Wu et al.

(10) Patent No.: US 7,957,472 B2
(45) Date of Patent: Jun. 7, 2011

(54) ENHANCED SIGNALING SENSITIVITY USING MULTIPLE REFERENCES

(75) Inventors: Hung Jen (Henry) Wu, Cupertino, CA (US); Yolin Lih, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1033 days.

(21) Appl. No.: 11/745,370

(22) Filed: May 7, 2007

(65) Prior Publication Data

US 2008/0279310 A1  Nov. 13, 2008

(51) Int. Cl.
*H04B 14/06* (2006.01)
(52) U.S. Cl. ...................................................... 375/244
(58) Field of Classification Search .................. 375/244, 375/316, 318, 330
See application file for complete search history.

(56) References Cited

U.S. PATENT DOCUMENTS 4,220,922 A * 9/1980 Ikeguchi .................... 455/182.1
7,136,429 B2 * 11/2006 Bois et al. ..................... 375/316

* cited by examiner

*Primary Examiner* — Kevin Y Kim
(74) *Attorney, Agent, or Firm* — Osha Liang LLP

(57) ABSTRACT

A receiver circuit uses two or more comparators to detect the received data signal. Each comparator is set to compare the data signal to a different reference signal. The output signals of the comparators are received into a detector circuit, which provides a third output signal that establishes the logic state of the received signal based on whether or not the output signals of the comparators are equal. Depending on the logic state of the data signal, one of the comparators provides its output signal sooner than the other. Each comparator may be implemented by a differential amplifier. In one embodiment, the reference signals are threshold voltages which may be provided by the tripping voltages at the trip points for the logic HIGH and LOW states.

17 Claims, 1 Drawing Sheet

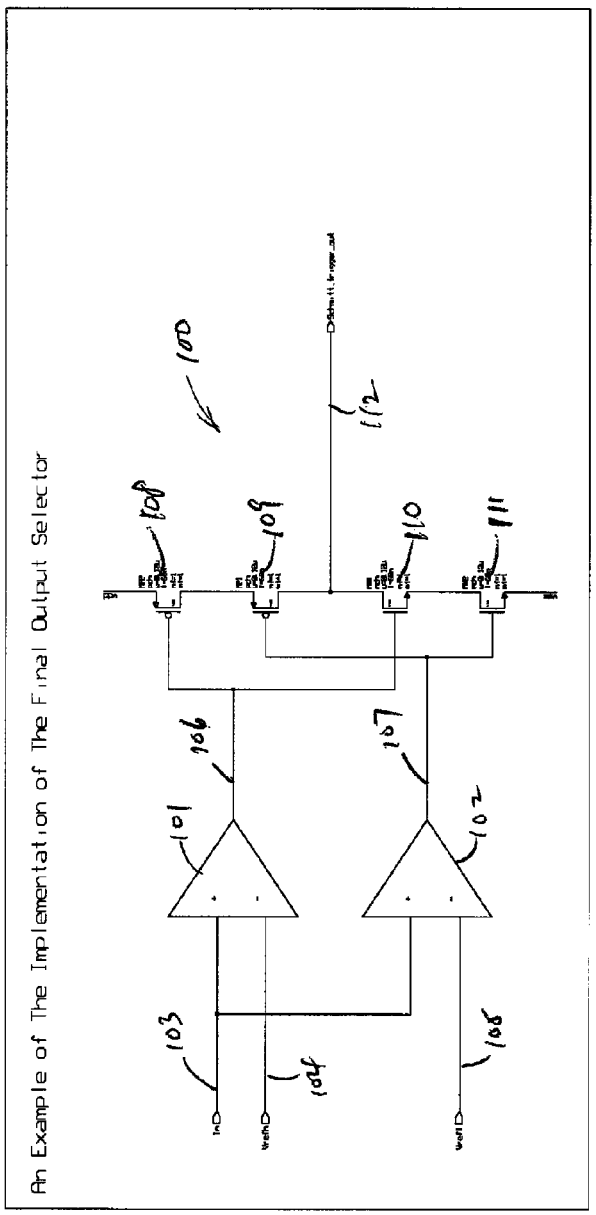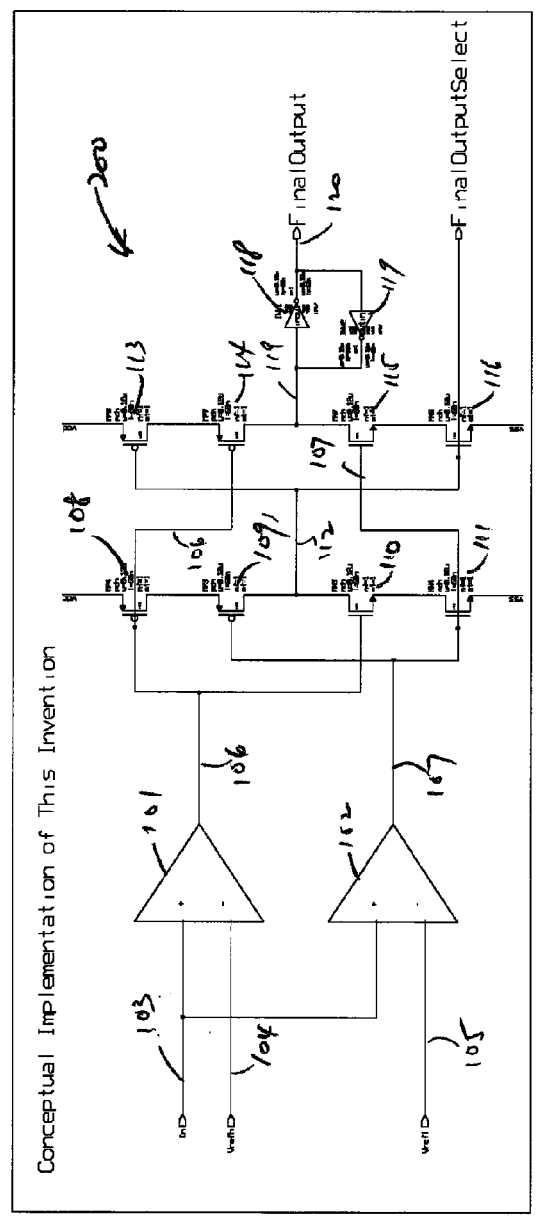

ENHANCED SIGNALING SENSITIVITY USING MULTIPLE REFERENCES

BACKGROUND OF THE INVENTION

High data rate signal transmission between integrated circuits requires a high degree of signal integrity. For example, at the gigabit data rate, a signal traveling over even a few centimeters on a conductor ("trace") may experience sufficient delay and distortion to cause difficulty in recovery at the receiving end. Various methods for detection have been devised to increase detection sensitivity. Differential-pair signaling and single-ended pseudo-differential signaling are two methods that are often used.

In differential-pair signaling, two wires carrying complementary forms of a signal are provided for each physical channel. At the receiver, the transmitted signal is recovered by taking the difference of the signals on the two wires. As an external signal reference is not required at the receiver, differential-pair signaling uses "self-reference detection."

In single-ended pseudo-differential signaling, only one wire is used to carry a data signal for each physical channel. The receiver compares the data signal with a reference signal. The signal reference may be self-generated or may be transferred from the transmitter.

While differential-pair signaling has better performance over single-ended pseudo-differential signaling, differential-pair signaling is typically less efficient, as it requires twice the wiring, and consumes twice the power. Single-ended signaling has a lower cost per channel, but single-ended pseudo-differential signaling typically has a lower performance because its lower signal sensitivity—i.e., the received signal has a larger uncertainty zone. Consequently, the received signal is more susceptible to a false detection due to noise, for example. This condition is referred to in the technical literature as having a "smaller eye-opening."

To take advantage of its lower cost per channel, the prior art attempts to improve sensitivity and performance in the single-ended approach. One such signaling scheme is referred to as "JAZIO." JAZIO compares a single-ended data signal with two phases of a clock signal transmitted with the data signal to achieve enhanced differential sensing at the receiver. JAZIO is described, for example, in (1) E. Haq, et al, "JAZIO Signal Switching Technology," *IEEE Micro*, January-February 2001, pp. 72-81; (2) K. Krewell, "JAZIO Slow Edges Can Run Fast-A Novel Approach to High-Performance Bus Interfaces," in Microprocessor Report, issue Feb. 21, 2000-2002, February 2000, pp. 1-4; (3) "Improving Performance of Parallel Interfaces using Steady State Voltage and Timing References", JAZIO, Inc., JAZIO High Speed Digital I?O Signal Switching Technology white paper, Aug. 1, 2002.

Among the signaling techniques discussed above, the pseudo-differential signaling technique has the lowest receiver sensitivity. Differential-pair signaling technique runs at about one-half speed per trace, as two traces are used per data bit. In particular, in a wide parallel bus application, differential-pair signaling technique has poor bus signal integrity because of the complex signal coupling that results from switching signals carried on traces in close proximity. JAZIO signaling is complex in its generation of the signal references, and in its post-processing, which is required after the initial stage of detection.

Therefore, there exists a long-felt need for a high sensitivity signaling technique with a sensitivity performance comparable to differential-pair signaling without its high cost, and without the complex post-processing required in JAZIO signaling.

SUMMARY

According to one embodiment of this invention, a receiver circuit uses two or more comparators to detect the received data signal. Each comparator is set to compare the data signal to a different reference signal. The output signals of the comparators are received into a detector circuit, which provides a third output signal that establishes the logic state of the received signal based on whether or not the output signals of the comparators are equal. Depending on the logic state of the data signal, one of the comparators provides its output signal sooner than the other. Each comparator may be implemented by a differential amplifier. In one embodiment, the reference signals are threshold voltages which may be provided by the tripping voltages at the trip points for the logic HIGH and LOW states.

According to another embodiment of this invention, the receiver may further include a latched stage having a multiplexer and a latch. Based on the output signal of the detector circuit, the multiplexer selects one of the comparator output signals to output. The output signal of the multiplexer, which is received into the latch, is the earlier one of the comparator output signals to change logic state, latched prior to the detector circuit detects the change in logic state in one of the comparator output signals.

The present invention is better understood upon consideration of the detailed description below and the accompanying drawings.

BRIEF DESCRIPTION OF THE DRAWINGS

FIG. 1 shows receiver 100, in accordance with one embodiment of the present invention.

FIG. 2 shows receiver circuit 200, in accordance with a second embodiment of the present invention.

To facilitate comparison between the figures, like elements in the figures are assigned like reference numerals.

DETAILED DESCRIPTION OF THE PREFERRED EMBODIMENTS

This invention provides the advantages of single-ended signaling, such as lower cost and power, while at the same time achieves detection speed and performance comparable to those of differential-pair signaling. The present invention also provides better receiver sensitivity than that achieved in the pseudo-differential signaling technique. In addition, this invention achieves twice the data transfer rate of the differential-pair signaling technique for the same number of data traces. A method of the present invention provides much simpler multiple reference generation and post-processing to achieve robust and more sensitive data detection.

FIG. 1 shows receiver 100, in accordance with one embodiment of this invention. Receiver 100 includes differential amplifier 101 and 102 that compares a single-ended data signal provided at terminal 103 against reference signals $V_{refH}$ and $V_{refL}$ at terminals 104 and 105, respectively, These comparisons determine differentially whether a HIGH or LOW logic signal is received at terminal 103. Reference voltages $V_{refH}$ and $V_{refL}$ at terminals 104 and 105 may be set, for example, at reference voltages VIH and VIL, representing the design trip or threshold points for logic circuits. The reference signals may be provided, for example, by the transmitter to one or more receivers, or may be locally generated. VIH and VIL reference may also be tapped from the power rail ring of VIH and VIL respectively. In one embodiment, additional detectors may be provided to detect the complementary phases CLOCK+ and CLOCK− of a two-phase clock signal, if required.

Differential amplifier 101 compares the input data signal at terminal 103 with reference voltage VIH, while differential amplifier 102 compares the input data signal at terminal 103 with the other reference signal VIL. As differential amplifier 101 receives reference voltage VIH, differential amplifier 101 detects a logic LOW state in the data signal much earlier than differential amplifier 102, because the voltage difference at the input terminals of differential amplifier 101. Similarly, differential amplifier 102, receiving reference voltage VIL detects a logic HIGH state earlier than differential amplifier 101.

Differential amplifiers 101 and 102, PMOS transistors 108 and 109 and NMOS transistors 110 and 111 form a "Schmitt-trigger". When the output values of differential amplifers 101 and 102 at terminals 106 and 107 agree (i.e., either both PMOS transistors 108 and 109 are conducting, or both NMOS transistors 110 and 111 are conducting), an output signal—which is logically an inversion of the data signal at terminal 103—is provided at terminal 112. As one of differential amplifiers 101 and 102 develop its output signal faster, as discussed above, the output signal at terminal 112 develops only after the later one of the signals at terminals 106 and 107 has developed. When the output values of differential amplifiers 101 and 102 at terminals 106 and 107 disagree with each other, the output value at terminal 112 remains unchanged.

The voltages $V_{dd}$ (supply voltage), $V_{refH}$ and $V_{refL}$ are not limited to the values described above. In any implementation, the appropriate values for voltages $V_{dd}$, $V_{refH}$ and $V_{refL}$ depend upon process, technology and application. In fact, they may even be dynamically changed. As more advanced and faster data rate process and technology are developed, the suitable values for $V_{dd}$, $V_{refH}$ and $V_{refL}$ generally decrease.

One suitable application for the signaling scheme of this invention is in an interface with dynamic random access memory circuits ("DRAM circuits"). For example, in a DDR2 circuit (i.e., $2^{nd}$ generation double data rate DRAM circuit), $V_{dd}$ is nominally 1.8 volts, with $V_{refH}$ and $V_{refL}$ set to be 0.2 volts above and below one-half of voltage $V_{dd}$, respectively (i.e., nominal $V_{refH}$=1.1 volts and nominal $V_{refL}$=0.7 volts). In such an application, it is possible to have $V_{refH}$ and $V_{refL}$ at 0.125 volts above and below one-half of voltage $V_{dd}$, respectively (i.e., $V_{refH}$=10.125 and $V_{refL}$=0.775 volts).

Similarly, in a DDR3 circuit (i.e., $3^{rd}$ generation double data rate DRAM circuit), $V_{dd}$ is nominally 1.5 volts, with $V_{refH}$ and $V_{refL}$ set to be 0.175 volts above and below one-half of voltage $V_{dd}$, respectively (i.e., nominal $V_{refH}$=0.925 volts and nominal $V_{refL}$=0.575 volts). In such an application, it is possible to have $V_{refH}$ and $V_{refL}$ at 0.10 volts above and below one-half of voltage $V_{dd}$, respectively (i.e., $V_{refH}$=0.85 and $V_{refL}$=0.65 volts).

As mentioned above, $V_{refH}$ (e.g., VIH) and $V_{refL}$ (or VIL) can be dynamically adjustable (or dynamically scaling) instead of having fixed values. Adjustments may depend on the length of the communication channel between the transmitter and the receiver. For example, for a supply voltage $V_{dd}$ of 1.5 volts, the data strengths on transmitter side are VOH=1.2 volts (i.e., logic HIGH) and VOL=0.3 volts (i.e., at logic LOW). In memory applications, the communication channel is typically short (e.g., about 8 inches). However, for a switch application or a router application, the communication channel is much longer (e.g., 32 inches or more). For the same transmitting strength at the transmitter, the strength of the signal received over a short communication channel is typically much higher than the strength of the signal received over a longer communication channel. For example, data transmitted at VOH=1.2 volts and VOL=0.3 volts may be received at VIH=0.925 volts and VIL=0.575 volts, respectively, at the receiver after transmission over an 8-inch communication channel. The same transmitted data at VOH=1.2 volts and VOL=0.3 volts may be received at VIH=0.85 volts and VIL=0.65 volts after transmission over a 32-inch communication channel. Hence, the values of $V_{refH}$ and $V_{refL}$ should be adjusted (or dynamically scaled at the receiver circuit) for different applications, according to the communication channel length.

In one implementation, the input buffer for the data signal drives two conductors or traces, which are internally connected to the comparators for comparing with VIH and VIL, respectively. VIH and VIL can be sourced from the global VIH and VIL reference signals for the entire integrated circuit. These VIH and VIL reference signals are distributed throughout the integrated circuit globally by power rail rings, which distribute the VIH and VIL reference signals internally to all input buffers. Thus, the layout for input data line wiring for a signaling technique under this invention is much simpler and cleaner than that of the JAZIO technology, which requires transmitting data, clock+ & clock− signals externally as input signals to the receiver. Greater signal integrity performance is therefore achieved due to simpler and better wiring scheme.

FIG. 2 shows receiver circuit 200, in accordance with a second embodiment of the present invention. To facilitate comparison between FIG. 1 and FIG. 2, like elements in the figures are assigned like reference numerals. As shown in FIG. 2, receiver circuit 200 includes receiver circuit 100, and additionally, PMOS transistors 113 and 114, NMOS transistors 115 and 116, and cross-coupled inverters 118 and 119. The output signals of differential amplifiers 101 and 102 at terminals 106 and 107 are also provided to the gate terminals of PMOS transistor 114 and NMOS transistor 115, respectively. Terminal 120 provides the final output value of receiver circuit 200. Because the value at terminal 112 does not change until after the later one of the output values of differential amplifiers 101 and 102 has developed, when the data signal at terminal 103 changes state, the previous output value at terminal 112, in conjunction with the earlier one of the output values at terminals 106 and 107 to arrive, changes the output value at terminal 119, prior to the change in output value at terminal 112. PMOS transistors 113 and 114 and NMOS 115 and 116 form a early detector. The output value at terminal 119 is latched into cross-coupled inverters 118 and 119 to provide a latched output value at terminal 120.

Therefore, differential amplifiers 101 and 102 provide an enhanced sensitivity with a larger eye opening for next-stage multiple comparators and post processing circuits to detect the data signal. Differential sensing with enhanced sensitivity at the receiver is achieved with only one signal trace per data bit. The techniques of the present invention may be used in high speed memory applications (e.g., the XDR and DDR memory buses), large parallel high speed bus applications with enhanced bus signal integrity. Bus signal integrity is enhanced because the complex coupling due to switching in the vicinity of crowded traces is reduced.

The hardware described above, including any logic or transistor circuit, may be generated automatically by computer based on a description of the hardware expressed in the syntax and the semantics of a hardware description language, as known by those skilled in the art. Applicable hardware description languages include those provided at the layout, circuit netlist, register transfer, and schematic capture levels. Examples of hardware description languages include GDS II and OASIS (layout level), various SPICE languages and IBIS (circuit netlist level), Verilog and VHDL (register transfer level) and Virtuoso custom design language and Design Architecture-IC custom design language (schematic capture level).

The above detailed description is provided to illustrate specific embodiments of the present invention and is not intended to be limiting. Numerous modifications and variations within the scope of the invention are possible. The present invention is set forth in the following claims.

We claim:

1. A receiver circuit for receiving a data signal, comprising:
    a first comparator receiving the data signal and a first reference voltage to provide a first output signal representing a first detected logic state of the data signal;
    a second comparator receiving the data signal and a second reference voltage to provide a second output signal representing a second detected logic state of the data signal; and
    a detector circuit receiving the first and second output signals and providing a third output signal, the third output signal changes state when the first and the second detected logic states agree, wherein
    the first comparator provides the first output signal sooner than the second comparator provides the second output signal when the data signal transitions to a first logic state, and
    the second comparator provides the second output signal sooner than the first comparator provides the first output signal when the data signal transitions to a second logic state opposite the first logic state.

2. A receiver as in claim 1, further comprising a second detector circuit receiving the first, second and third output signals, the second detector configured to provide a fourth output signal representing the earlier of the first and the second logic signals in response to the data signal transition.

3. A receiver circuit as in claim 2, wherein the second detector circuit comprises a multiplexer.

4. A receiver circuit as in claim 3, further comprising a latched stage receiving the fourth output signal.

5. A receiver circuit as in claim 1, wherein the first and second comparators each comprise a differential amplifier.

6. A receiver circuit as in claim 1, wherein the first reference voltage corresponds to the lowest voltage of a logic HIGH signal.

7. A receiver circuit as in claim 1, wherein the second reference voltage corresponds to the highest voltage of a logic LOW signal.

8. A method for receiving a data signal, comprising:
    comparing the data signal with a first reference voltage to provide a first output signal representing a first detected state of the data signal, and simultaneously, comparing the data signal in a second comparator with a second reference voltage to provide a second output signal representing a second detected state of the data signal; and
    detecting the first and second output signals and providing a third output signal, changing the logic state of the third output signal when the first and the second detected states agree, wherein
    the first output signal is provided sooner than the second output signal when the data signal transitions to a first logic state, and
    the second output signal is provided sooner than the first output signal when the data signal transitions to a second logic state opposite the first logic state.

9. A method as in claim 8, further comprising providing a fourth output signal representing the earlier of the first and the second logic signals, in response to the data signal transition.

10. A method as in claim 9, further comprising latching the fourth output signal.

11. A method as in claim 8, wherein each of the comparing is performed by a differential amplifier.

12. A method as in claim 8, wherein the first reference voltage corresponds to the lowest voltage of a logic HIGH signal.

13. A method as in claim 8, wherein the second reference voltage corresponds to the highest voltage of a logic LOW signal.

14. A receiver circuit for a data signal, comprising:
    a first stage receiving the data signal to provide a first output signal and a second output signal, the first output signal changing logic state sooner than the second output signal changing logic state when the data signal transitions to a first logic state, and the second output signal changing logic state sooner than the first output signal changing logic state when the data signal transitions to a second logic state opposite the first logic state; and
    a second stage receiving the first and second output signals to provide a third output signal that changes logic state after both the first and second output signals changes logic state.

15. A receiver circuit as in claim 14, further comprising a third stage receiving the first and second output signals and the third output signal to provide a fourth output signal, the fourth output signal changing logic state when the earlier of the first and second output signal changes logic state, and prior to the third output signal changes logic state.

16. A receiver circuit for a data signal, comprising:
    in a first stage, means receiving the data signal for providing a first output signal and a second output signal, the first output signal changing logic state sooner than the second output signal changing logic state when the data signal transitions to a first logic state, and the second output signal changing logic state sooner than the first output signal changing logic state when the data signal transitions to a second logic state opposite the first logic state; and
    in a second stage, means for receiving the first and second output signals for provide a third output signal that changes logic state after both the first and second output signals changes logic state.

17. A receiver circuit as in claim 16, further comprising a third stage receiving the first and second output signals and the third output signal for provide a fourth output signal, the fourth output signal changing logic state when the earlier of the first and second output signal changes logic state, and prior to the third output signal changes logic state.

* * * * *